United States Patent
Aono et al.

(10) Patent No.: US 6,697,743 B2
(45) Date of Patent: Feb. 24, 2004

(54) APPARATUS FOR MEASURING INTAKE AIR FLOW OF INTERNAL COMBUSTION ENGINE

(75) Inventors: Toshihiro Aono, Abiko (JP); Takehiko Kowatari, Kashiwa (JP); Shinya Igarashi, Naka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/128,285

(22) Filed: Apr. 24, 2002

(65) Prior Publication Data

US 2003/0204334 A1 Oct. 30, 2003

(51) Int. Cl.[7] .............................. G01F 1/00; G01F 19/00
(52) U.S. Cl. ............................ 702/45; 702/56; 702/126; 702/199
(58) Field of Search .............................. 702/33–35, 45, 702/50, 56–57, 74–75, 100, 106, 124–126, 190, 198–199; 73/118.2, 116, 204.16, 204.18; 123/437–439, 478, 479, 492

(56) References Cited

U.S. PATENT DOCUMENTS

| 4,404,846 | A | * | 9/1983 | Yamauchi et al. | ......... 73/118.2 |
| 4,571,990 | A | * | 2/1986 | Honig | ........................ 73/118.2 |
| 5,365,787 | A | * | 11/1994 | Hernandez et al. | ........... 73/660 |
| 5,832,403 | A | * | 11/1998 | Kowatari et al. | ........... 701/103 |
| 6,334,083 | B1 | * | 12/2001 | Aono et al. | .................. 701/102 |

FOREIGN PATENT DOCUMENTS

| JP | 61-213728 | 9/1986 |
| JP | 7-167697 | 7/1995 |
| JP | 10-300544 | 11/1998 |
| JP | 2000-265898 | 9/2000 |

* cited by examiner

Primary Examiner—Bryan Bui
(74) Attorney, Agent, or Firm—Antonelli, Terry, Stout & Kraus, LLP

(57) ABSTRACT

An apparatus for measuring an intake air flow of an internal combustion engine, wherein presence of a backflow is determined from a waveform of the electric signal of flow detecting unit. If a backflow is present, a kurtosis is calculated. A backflow ratio is calculated based on the relation obtained from the kurtosis and the backflow ratio. The mass of the flow obtained by converting electric signals from the flow detecting unit into flows are integrated or averaged. Then, the integrated value or the average value is compensated by the backflow ratio, and accumulate mass of the air flow is calculated.

19 Claims, 5 Drawing Sheets

APPARATUS FOR MEASURING INTAKE AIR FLOW OF INTERNAL COMBUSTION ENGINE

BACKGROUND OF THE INVENTION

The present invention relates to an apparatus for measuring the intake air flow into an internal combustion engine.

Conventionally, as a system for measuring an intake air flow of the internal combustion engine, a hot wire type air flow meter has been widely used. This air flow meter uses a hot wire sensor exposed in an intake air passage. The hot wire is supplied with a current which is controlled to keep constant temperature of the hot wire. An air flow passed through a cross section of the intake air passage, in which the hot wire is disposed, is measured based on the value of the supplied current of the hot wire. This hot wire type air flow meter can measure an absolute value of an air flow, but can not determine the direction of the air flow.

In an internal combustion engine, the intake air pulsates because of the piston reciprocation in the cylinders. The amplitude of the pulsation increases according to the opening angle of the throttle. When the amplitude exceeds a certain value, the intake air flows in the reverse direction temporarily. The reverse flow is called a backflow.

In addition, the hot wire type air flow meter has response delay which is caused by a heat capacity of its own. There is a nonlinear correlation between the air flow and an output of the hot wire type air flow meter.

In control of the internal combustion engine, the mass of the intake airflow is calculated by averaging the pulsating signal from the hot wire type air flow meter. The integrated value of the air flow mass converted from the electric signal, or the integrated value of the electric signal has an error. The error is equal to twice the mass of the backflow.

Several methods have been presented in order to solve the above-described problems.

JP-A-10-300544 discloses a method of compensating the detected signal wherein a threshold value is calculated based on the maximum and minimum values of the detected signal from the hot wire type air flow meter, determining the backflow period in the air flow signal based on comparison of the threshold value and the detected signal, and the detected signal is corrected when a backflow is determined to occur.

JP-A-7-167697 discloses a method for correcting the measured signal from hot wire type air flow meter. In this method, the peak and valley points of the measured signal from a hot wire type air flow meter are detected, a time length from the peak to the valley is calculated, and the existence of the backflow is determined based on the calculated time length. The measured signal is corrected when a backflow is determined to occure.

JP-A-61-213728 discloses a method of correcting the measured signal from hot wire type air flow meter. In this method, a change of direction of the intake air flow is detected by comparing a difference of the measured signal from a hot wire with the threshold value. The backflow is detected based on the changing point of the air flow direction, and the measured signal is corrected when a backflow is determined to occur.

JP-A-2000-265898 discloses a method of correcting the measured signal from hot wire type air flow meter. In this method, a frequency spectrum is extracted from the measured signal, estimating a ratio of a backflow is estimated based on the relationship between a frequency spectrum and a backflow ratio, and the measured signal is corrected by using the backflow.

In a system for detecting intersection whether the detected signal crosses the threshold or not, e.g., in the method described in JP-A-10-300544, the crossing cannot be detected robustly because of the noise in the signal. Thus, there is a problem of reliability in practical use.

In the method described in JP-A-7-167697, the peaks and valleys are detected. However, if noises interfere the measured signal, false maximum and minimum points may detected other than the correct maximum and minimum. Thus, there is a problem of reliability in practical use.

In the method described in JP-A-61-213728, the difference of the measured signal is compared with the threshold. This threshold varies according to the engine condition, such as engine rotation speed and throttle opening angle. It is difficult to find a method for calculating this threshold for all engine condition.

The method described in JP-A-2000-265898 is different from the techniques disclosed in above mentioned three documents, because determination of a backflow section is not performed. This method is advantageous in robustness because a characteristic value, such as a frequency spectrum, is extracted from the entire waveform in a given section of the measured signal, backflow determination is not necessary. However, to extract the frequency spectrum, a revolution speed of the crankshaft must be detected, or estimated from the waveform. To obtain the revolution speed of the crankshaft increases the costs of an input unit, and estimation of the revolution speed from the waveform increases an amount of calculation.

SUMMARY OF THE INVENTION

An object of the present invention is to provide an apparatus for measuring an intake air flow of an internal combustion engine, which compensates the backflow effect robustly without determining the flow direction with small calculation cost.

In order to achieve the above-described object, there is provided an apparatus for measuring an intake air flow of an internal combustion engine by using an output of flow detecting means by a heat resistor, comprising: flow converting means for converting the electric signal from the flow detecting means into the mass of the flow; backflow determining means for determining presence of a backflow based on the electric signal outputted by the flow detecting means; kurtosis calculating means for calculating the kurtosis for the distribution of the electric signal from the waveform of the flow detecting means when a backflow is determined to exit; backflow ratio calculating means for calculating the backflow ratio based on the kurtosis; and flow calculating means for integrating the instantaneous mass of the flow converted from the electric signals by the flow converting means, and for calculating the real mass of the flow by compensating the integrated mass with the backflow ratio.

Other objects, features and advantages of the invention will become apparent from the following description of the embodiments of the invention taken in conjunction with the accompanying drawings.

BRIEF DEDCRIPTION OF THE DRAWINGS

DESCRIPTION OF THE EMBODIMENTS

Figure 3:
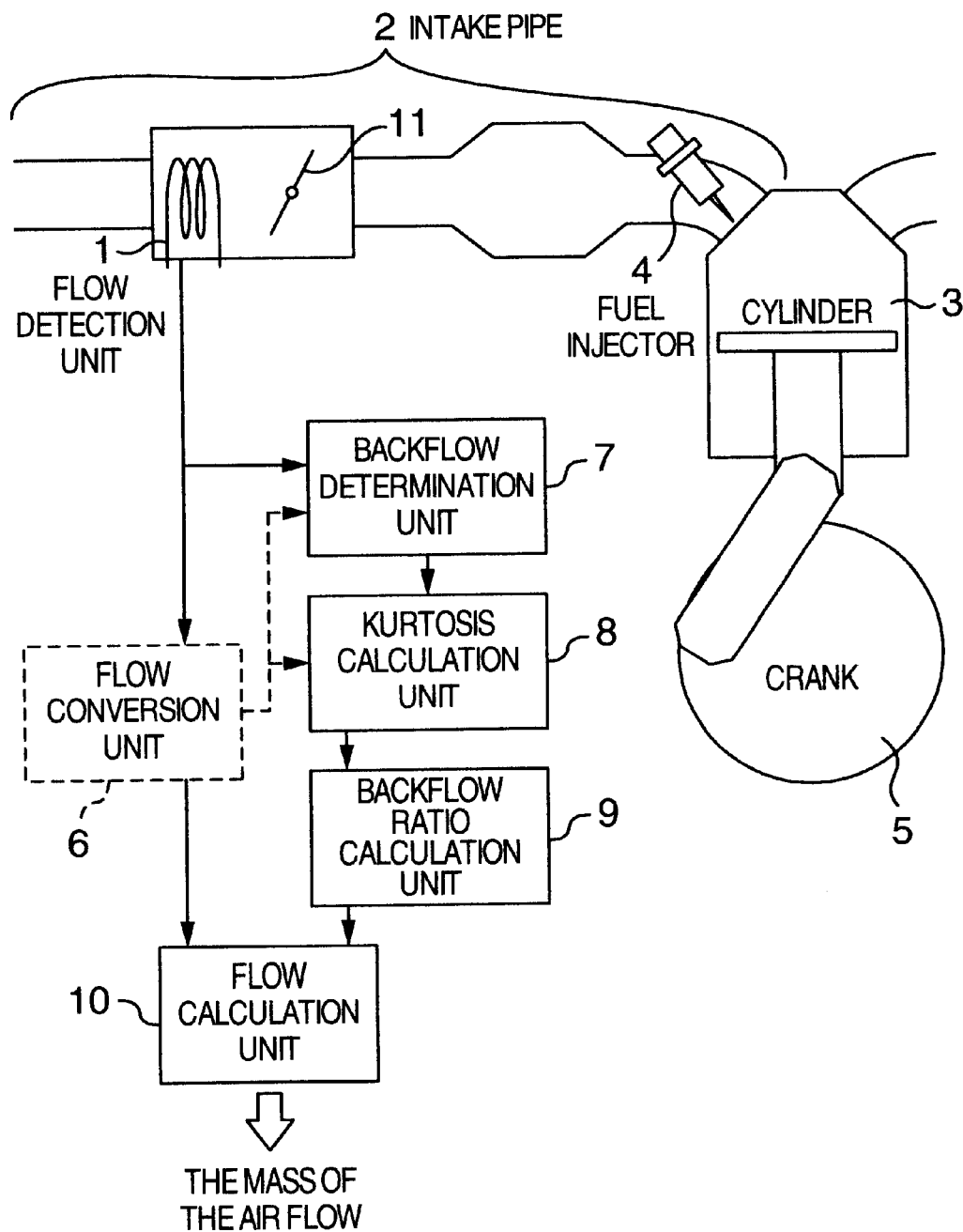
FIG. 3 is a diagram showing an example of configuration of an apparatus for measuring an intake air flow in an internal combustion engine according to the present invention.

FIG. 3 shows arrangement of a thermal type air flow meter in an internal combustion engine.

The thermal type air flow meter as flow detecting means is an air flow meter which uses a heat resistor, such as hot wire, a hot film, or a silicon element, for converting a change in heat into an electric signal. The internal combustion engines takes air through an intake pipe 2 into a cylinder. Air passed through the intake pipe 2 removes heat from the heat resistor of a thermal type flow meter 1. The amount of removed heat is converted into an electric signal, and accordingly the air flow into a cylinder 3 via the intake pipe 2 is measured as the electric signal. In this engine, fuel is supplied by a fuel injector 4 arranged in the intake pipe or the cylinder. The amount of fuel supply is set to the value obtained by dividing the amount of air measured by the thermal type air flow meter by a predetermined air-fuel ratio. Mixture gas of the air and the fuel taken into the cylinder is compressed, and then ignited to cause explosion, thus torque is generated. The value of generated torque depends on the amount of air and the amount of fuel taken into the cylinder. Thus, the thermal type air flow meter is used for measuring an amount of air taken into the cylinder. The measured air flow is used for controlling torque generated by the internal combustion engine and also controlling an air-fuel ratio.

Figure 1:
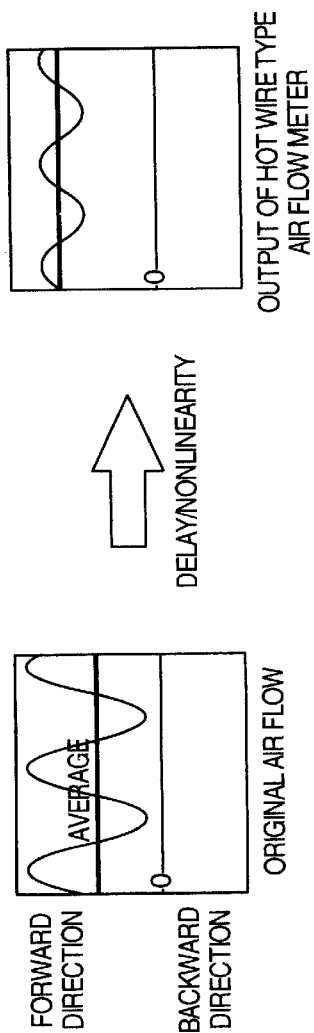
FIG. 1 shows an example of a relation between an air flow and an output signal in a thermal type flow meter.
Figure 2:
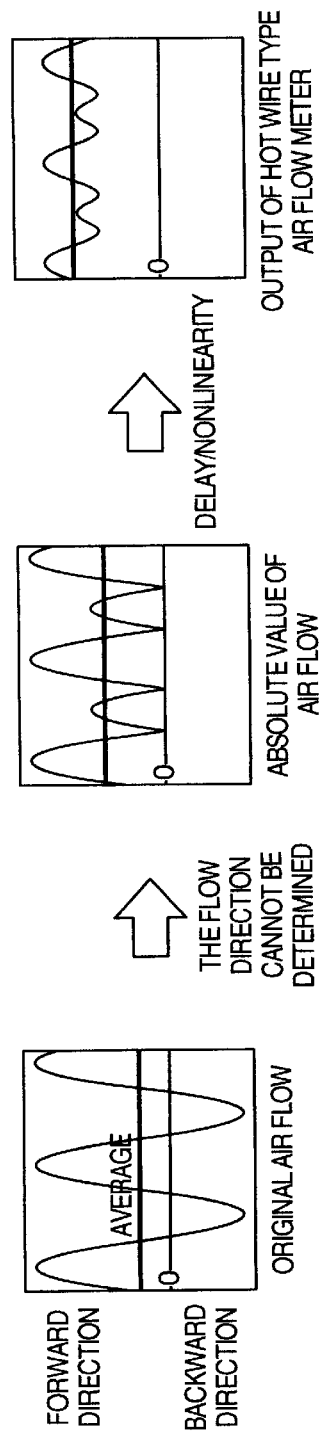
FIG. 2 shows an example of a relation between an air flow and an output signal in the thermal type air flow meter.

FIG. 1 shows a relation between an air flow and an output signal measured by a hot wire type flow meter. FIG. 2 shows an example of an air flow when a backflow occurs, in which a positive flow represents a forward flow and a negative flow represents a backflow.

In an internal combustion engine, the intake air pulsates because of the piston reciprocation in the cylinders, and the air flow at the cross section of the intake pipe, where the hot wire sensor is exposed, shows a periodic function as shown in the left graph of FIG. 1. When the opening angle of the throttle becomes large, the amplitude of the pulsation increases. As a result, the air flow sometimes get into the negative region of the left graph of FIG. 2. This phenomenon is called a backflow. Considering that the hot wire type air flow meter can detect only an absolute value of a flow, the signal detected by the hot wire type air flow meter when a backflow occurs becomes similar to the signal in a middle graph of FIG. 2.

In addition, the hot wire type air flow meter has response delay caused by a heat capacity of its own. Also, there is a nonlinear correlation between an air flow and an output of the hot wire type air flow meter. Considering such delay and nonlinearity, the output signal of the hot wire type air flow meter becomes similar to the signal in the right graph of FIG. 1 or 2.

In engine control, pulsation of the hot wire type air flow meter is averaged to be used as the mass of the air flow. If an air flow detected by the hot wire type air flow meter, as shown in the middle graph of FIG. 2, and an output of the hot wire type air flow meter affected by response delay or nonlinearity, as shown in the right side of FIG. 2, are integrated without compensation, then surplus air corresponding to a backflow is regarded as being taken into the intake pipe.

As described above, when the amplitude of the pulsation of the air passed through the intake pipe becomes large, the air flowing through the intake pipe may flow backward. Since the thermal type air flow meter can measure only an absolute value of an air flow, an air flow obtained by subtracting a backflow from a forward flow is a real air flow taken into the cylinder. However, if a signal outputted from the thermal type air flow meter is integrated, the result of integration is the sum of the mass of the forward flow and the mass of the back flow. The error of this calculation is twice the mass of the back flow. According to the invention, the real mass of air flow taken into the cylinder is calculated by obtaining a ratio between the forward flow and the backflow, and compensating for the integrated value of the output from the thermal type air flow meter using this ratio.

As shown in FIG. 3, a flow detection unit 1 includes a heat resistor and an electric circuit, and converts the amount of the heat removed from the heat resistor by the air flow into the electric signal. The electric signal outputted by this flow detection unit 1 is converted into the mass of the flow based on the relation between the mass of the flow and the electric signal by the flow conversion unit 6. On the other hand, a backflow determination unit 7 calculates, for example, the average and the dispersion of the electric signal from of the flow detection unit 1, and determines whether a backflow has occurred or not based on the average and the dispersion (detailed later). If a backflow occurs, then a kurtosis calculation unit 8 calculates the kurtosis of the distribution of the electric signal from the flow detection unit 1 (detailed later). If a backflow does not occur, then an output of the flow conversion unit 6 is directly used for flow calculation without calculating the kurtosis. Based on the obtained kurtosis, a backflow ratio is calculated by a backflow ratio calculation unit 9. A flow calculation unit 10 integrates the instantaneous mass of the flow converted from the signal by the flow conversion unit 6, and obtains the real mass of the flow by compensating based on the backflow ratio. In this way, it is possible to calculate the real mass of the air flow entering the cylinder 3 by compensating the error caused by the backflow.

The flow conversion unit 6 surrounded by the dotted line of FIG. 3 may be omitted from the configuration of the invention. In such a case, the flow calculation unit 10 directly integrates the electric signals, components the backflow effect and outputs a result. This compensated electric signal must be converted into the value of air flow in the system which receives the compensated signal such as fuel injection controller, or engine control unit.

Figure 4:
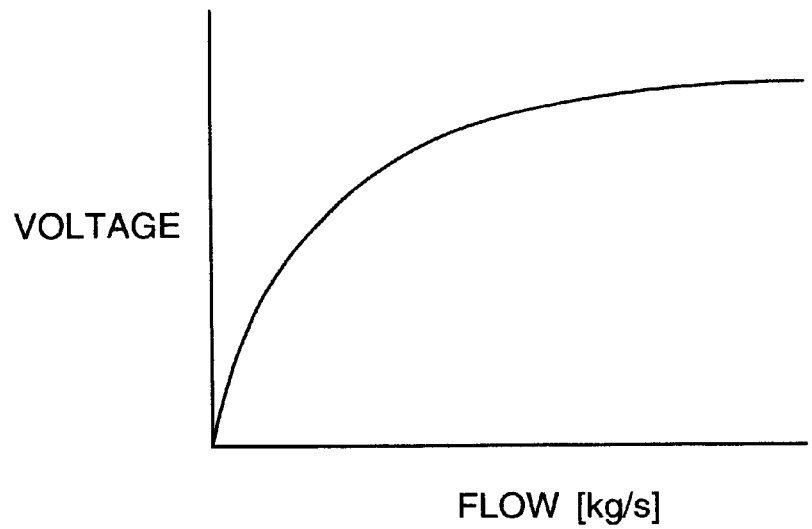
FIG. 4 is showing an example of the relation between the mass of the flow and an electric signal outputted from flow detecting means.

FIG. 4 shows an example of a relation between the mass of the flow and the electric signal outputted by the flow detection unit 1. This relation is determined by way of experiment beforehand, and recorded in a form, such as a function of converting the electric signal into the mass of the flow, or a relational map of the electric signal and the mass of the flow. Based on the recorded function, the flow conversion unit 6 converts the electric signal into a flow value.

Figure 5:
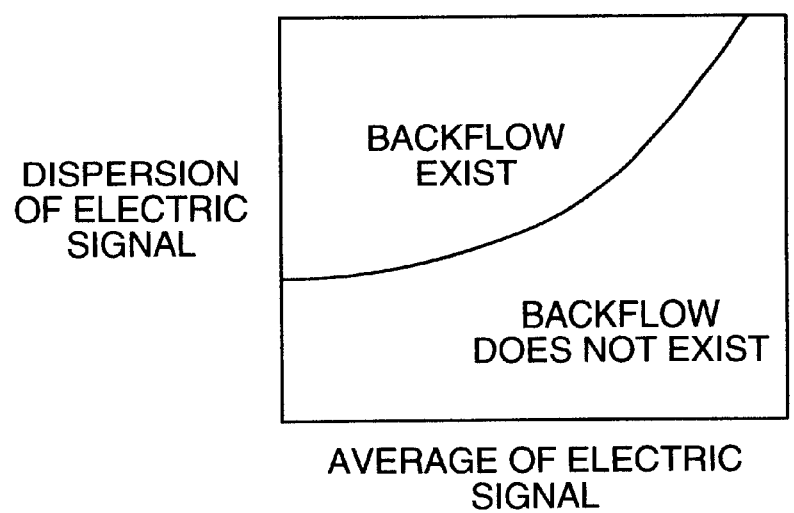
FIG. 5 is an example of a backflow map.

In a method installed in by the backflow determination unit 7 to determine a backflow, for example, the average and the dispersion of the electric signals from the flow detection unit 1 are calculated, and whether the combination of the average value and the dispersion below to the backflow-exist-area or the backflow-nonexist area of a backflow map is decided. FIG. 5 shows an example of a backflow map. Assuming that the average value of electric signals from the flow detection unit 1 is constant, no backflow occurs when dispersion of the electric signals is equal to/lower than a fixed value. However, a backflow occurs when the dispersion of the electric signals exceeds this fixed value. Thus, it is possible to determine the existance of a backflow by dividing a backflow map similar to that of FIG. 5 into two areas, and checking which of the two areas the combination of the average value and the dispersion belongs to.

Figure 6A:
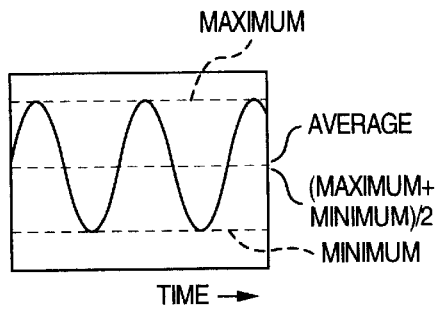
FIG. 6A shows an example of the electric signal from the thermal type flow meter when backflow does not occur.
Figure 6B:
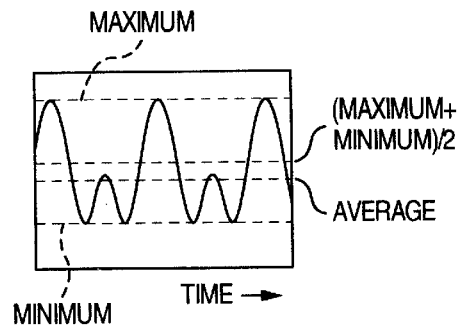
FIG. 6B shows an example of the electric signal from the thermal type flow meter when backflow occurs.

Another method for determining a backflow uses maximum and minimum values of the signal, and an average value of electric signals outputted by the flow detection unit 1 in a past fixed length of the period. In the case of an electric signal having no backflows shown in FIG. 6A, since a waveform is almost vertically symmetrical, a difference between the average of the electric signals and (maximum value+minimum value of electric signal)/2 is about 0. If the electric signal have a backflow shown in FIG. 6B, a waveform is distorted by the backflow, and the average value of the electric signals becomes smaller than (maximum value+ minimum value)/2. Thus, the shifting ratio of the electric signal average is calculated by the following expression (1):

$$\frac{(\text{average value}) - (\text{maximum value} + \text{minimum value}/2)}{\text{maximum value} - \text{minimum value}} \quad (1)$$

If the shift ratio calculated by the expression (1) is smaller than the threshold value, a backflow is determined to occur.

For determination of a backflow, instead of obtaining an average value and dispersion or maximum and minimum values of electric signals from the flow detection unit 1, an average and dispersion or maximum and minimum values may be obtained by using the mass of the flow resulted from conversion of the electric signal with the flow conversion unit 6, and, based on these, backflow determination may be carried out.

Now, before explanation of the operation of the kurtosis calculation unit 8, the kurtosis is defined.

Figure 7A:
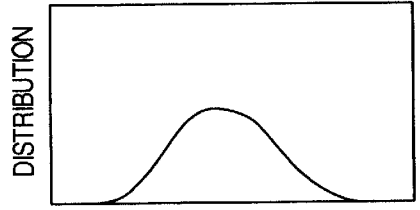
FIG. 7A shows an example of the electric signal distribution whose kurtosis is small.
Figure 7B:
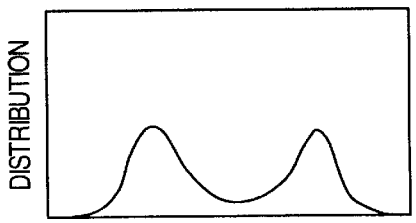
FIG. 7B shows an example of the electric signal distribution whose kurtosis is large.

The kurtosis is the degree to which a statistical distribution is sharply peaked at its average. For example, in the case of two distributions shown in FIGS. 7A and 7B, FIG. 7A shows the distribution is sharply peaked at the average. FIG. 7B shows a distribution whose peak is far from the average value. Thus, a kurtosis takes a larger value in FIG. 7A. A kurtosis is represented by the following expression (2) in statistics:

$$\frac{E[(x-\mu)^n]}{E[(x-\mu)^2]^{n/2}} \quad (2)$$

Here, an exponent n may be 4, or may take a value other than 4, for example, 6, 8, 4.1, or 6.05, in practice. In other words, n may be an even value of 4 or larger, or a value in the vicinity thereof.

Figure 8:
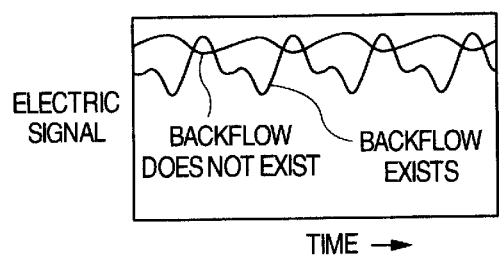
FIG. 8 shows examples of output waveforms of the flow detecting means when there is a backflow and when there are no backflows.

Next, the relation between the kurtosis and the backflow is described. FIG. 8 shows examples of electric signals of the flow detection unit 1 when there is a backflow and when there is no backflow. We can see in FIG. 8 that, when a backflow does not occurs, the slope of the electric signal become small hear its peak and valley. On the other hand, when a backflow does not occurs, there are some points where the slope of the electric signal is 0.

Figure 9:
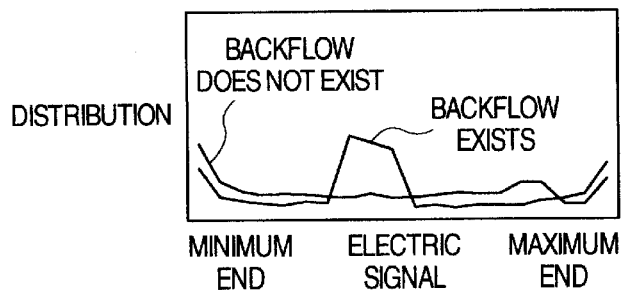
FIG. 9 shows examples of the distributions of the electric signal of the flow detecting means when there is a backflow and when there are no backflows.
Figure 10A:
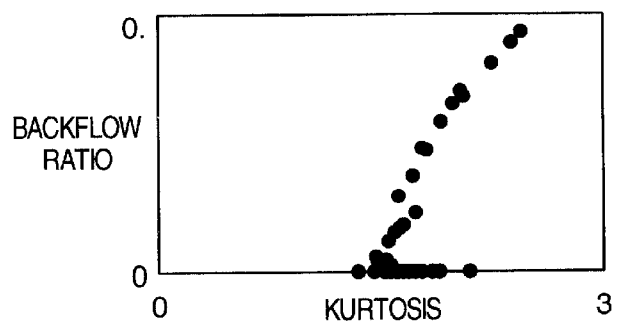
FIGS. 10A and 10B show examples of the relation between a kurtosis and a backflow ratio.
Figure 10B:
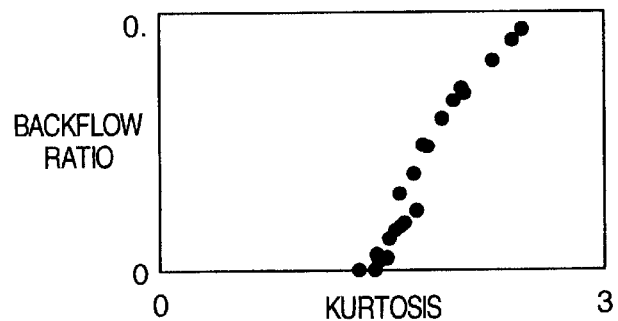

FIG. 9 shows the distribution of these electric signals. The maximum end in FIG. 9 corresponds to the peak in FIG. 8 and the minimum end in FIG. 9 corresponds to the valley in FIG. 8. When a backflow does not occur, the distribution of the electric signal has two peaks at the minimum end and the maximum end of the range of the electric signal. When a backflow occurs, the distribution has one more peak, other than the peaks in the both end, near the middle of the both end. As a result, when there is a backflow, compared with the case of no backflow, a distribution in the vicinity of an average value increases. In other words, when there is a backflow, a kurtosis is increased. An example of the relation between the backflow ratio and the kurtosis is shown in FIG. 10A. It can be seen that the backflow ratio is not always a single-valued function of the kurtosis. Accordingly, the presence of a backflow must be determined before calculation of a kurtosis. Excluding the area of no backflow, the backflow ratio becomes the single-valued function of the kurtosis as shown in FIG. 10B.

Based on such facts, the kurtosis calculation unit 8 calculates the kurtosis for the distribution of the electric signal outputted by the flow detection unit 1 by the expression (2). Alternatively, instead of calculating a kurtosis directly from the electric signal of the flow detection unit 1, a kurtosis may be calculated after conversion of the electric signal into the mass flow of the flow at the flow conversion unit 6.

The backflow ratio calculation unit 9 calculates a backflow ratio by substituting the obtained kurtosis for a backflow ratio calculation function. The backflow ratio calculation function is obtained in advance by fitting a curve to the relation between the kurtosis and the backflow ratio, shown in FIG. 10B.

After the calculation of the backflow ratio, an instantaneous value of the flow converted from the electric signal by the flow conversion unit 6 is integrated or averaged at the flow calculation unit 10. Then, by using the following expression (3), the integrated value or the average is compensated by using the backflow ratio R:

$$\frac{1-R}{1+R} \quad (3)$$

Thus, the real mass of the flow is calculated.

Thus, as the procedure described above, the presence of backflow is determined, a kurtosis is calculated if there is a backflow, a backflow ratio is obtained based on the kurtosis, and then the backflow is compensated. According to this procedure, the mass of the intake air flow into the cylinder 3 of the internal combustion engine can be calculated with high accuracy.

By calculating the backflow ratio based on the kurtosis of the distribution of the electric signal outputted by the air flow detection unit, it is possible to compensate the backflow without any dependence on a shape of the intake pipe or the cylinder of the internal combustion engine, to which the intake air flow measuring apparatus of the invention is attached. Moreover, according to the invention, since the kurtosis is obtained from the waveform without using the angular velocity information of the crank angle, it is possible to reduce the calculation cost. Also, the invention is advantageous from the view point that input means of the crank angle is not necessary.

It should be further understood by those skilled in the art that the foregoing description has been made on embodiments of the invention and that various changes and modifications may be made in the invention without departing from the spirit of the invention and the scope of the appended claims.

What is claimed is:

1. An apparatus for measuring an intake air flow of an internal combustion engine by using an output electrical signal of a flow detecting means, comprising:

flow converting means for converting said output electric signal of the flow detecting means into a mass of the flow;

backflow determining means for determining presence of a backflow based on the output electric signal of the flow detecting means;

kurtosis calculating means for calculating a kurtosis of a distribution of the output electric signal from the flow detecting means when a backflow is determined to be present by the backflow determining means;

backflow ratio calculating means for calculating a backflow ratio based on the kurtosis calculated by the kurtosis calculating means; and flow calculating means for integrating or averaging instantaneous mass of the air flows converted from the output electric signals of the flow detecting means by the flow converting means, and for calculating the real mass of the air flow by compensating the integrated or the average with the backflow ratio.

2. An apparatus for measuring an intake air flow according to claim 1, wherein the backflow determining means determines the presence of a backflow based on the average and the dispersion of the flows converted from the output electric signals of the flow detecting means by the flow converting means.

3. An apparatus for measuring an intake air flow according to claim 2, wherein the flow detecting means comprises a heat resistor.

4. An apparatus for measuring an intake air flow according to claim 1, wherein the backflow determining means determines a backflow based on maximum and minimum values and the average of the flows converted from the output electric signals of the flow detecting means by the flow converting means.

5. An apparatus for measuring an intake air flow according to claim 4, wherein the flow detecting means comprises a heat resistor.

6. An apparatus for measuring an intake air flow according to claim 1, wherein the flow detecting means comprises a heat resistor.

7. An apparatus for measuring an intake air flow of an internal combustion engine by using an output electric signal of a flow detecting means, comprising:

backflow determining means for determining presence of a backflow based on said output electric signal of the flow detecting means;

kurtosis calculating means for calculating a kurtosis of the distribution of the output electric signal from the flow detecting means when a backflow is determined to be present by the backflow determining means;

backflow ratio calculating means for calculating a backflow ratio based on the kurtosis calculated by the kurtosis calculating means; and flow calculating means for integrating or averaging the output electric signals outputted by the flow detecting means, and for calculating a real mass of the air flow by compensating the integral or average with the backflow ratio.

8. An apparatus for measuring an intake air flow according to claim 7, wherein the backflow determining means determines the presence of a backflow based on the average and dispersion of the waveforms of the output electric signals from the flow detecting means.

9. An apparatus for measuring an intake air flow according to claim 8, wherein the flow detecting means comprises a heat resistor.

10. An apparatus for measuring an intake air flow according to claim 7, wherein the backflow determining means determines a backflow based on maximum and minimum values and the average value of the waveforms of the output electric signals from the flow detecting means.

11. An apparatus for measuring an intake air flow according to claim 10, wherein the flow detecting means comprises a heat resistor.

12. An apparatus for measuring an intake air flow according to claim 7, wherein the flow detecting means comprises a heat resistor.

13. An apparatus for measuring an intake air flow of an internal combustion engine by using an output electric signal of a flow detector, comprising:

a backflow determining unit to determine presence of a backflow based on said output electric signal of the flow detector, a kurtosis calculator to calculate kurtosis of the distribution of the output signal from the flow detector when a backflow is determined to be present by the backflow determining unit;

a backflow ratio calculator to calculate a backflow ratio based on the kurtosis calculated by the kurtosis calculator; and a flow calculator to integrate or average the output electric signals outputted by the flow detector, and to calculate a real mass of the air flow by compensating the integral or average with the backflow ratio.

14. An apparatus for measuring an intake air flow according to claim 13, wherein the backflow determining unit determines the presence of a backflow based on the average and the dispersion of the flows converted from output electric signals of the flow detector by a flow converter.

15. An apparatus for measuring an intake air flow according to claim 13, wherein the backflow determining unit determines backflow based on maximum and minimum values and the average of the flow converted from the output electric signals of the flow detector by a flow convertor means.

16. An apparatus for measuring an intake air flow according to claim 13, wherein the flow detector comprises a heat resistor.

17. A method for measuring an intake air flow of an internal combustion engine by using an output electric signal of a flow detector, comprising:

a step of converting said output electric signal of the flow detector into a mass of the flow;

a step of determining presence of a backflow based on the output electric signal of the flow detector;

a step of calculating a kurtosis of a distribution of the output electric signal from the flow detector when a backflow is determined to be present by the backflow determining step;

a step of calculating a backflow ratio based on the kurtosis calculated by the kurtosis calculating step; and a step of integrating or averaging instantaneous mass of the air flows converted from the output electric signals of the flow detector in the flow converting step, and for calculating the real mass of the air flow by the compensating the integral or the average with the backflow ratio.

18. A method for measuring an intake air flow according to claim 17, wherein the backflow determining step determines the presence of a backflow based on the average and the dispersion of the flows converted from the output electric signals of the flow detector by the flow converting step.

19. A method for measuring an intake air flow according to claim 17, wherein the backflow determining step determines a backflow based on maximum and minimum values and the average of the flows converted from the output electric signals of the flow detector by the flow converting step.

* * * * *